(12) United States Patent
Reid

(10) Patent No.: US 7,976,036 B2
(45) Date of Patent: Jul. 12, 2011

(54) SYSTEM AND METHOD FOR ADAPTING A UNIT BEARING FRONT DRIVING AXLE

(76) Inventor: Dennis Reid, Pleasant Hill, CA (US)

(*) Notice: Subject to any disclaimer, the term of this patent is extended or adjusted under 35 U.S.C. 154(b) by 133 days.

(21) Appl. No.: 12/406,700

(22) Filed: Mar. 18, 2009

(65) Prior Publication Data

US 2009/0236813 A1    Sep. 24, 2009

Related U.S. Application Data

(60) Provisional application No. 61/037,486, filed on Mar. 18, 2008.

(51) Int. Cl.
*B62D 7/18* (2006.01)

(52) U.S. Cl. .............. 280/93.512; 180/252; 301/35.629; 301/124.1; 301/132

(58) Field of Classification Search .......... 180/252–255, 180/258; 280/93.511, 93.512; 301/35.629, 301/105.1, 124.1, 132, 131, 126
See application file for complete search history.

(56) References Cited

U.S. PATENT DOCUMENTS

| | | | | |
|---|---|---|---|---|
| 3,549,166 A * | 12/1970 | Moore et al. | ............. | 280/93.512 |
| 4,037,680 A * | 7/1977 | Grove | ............ | 180/254 |
| 4,337,953 A * | 7/1982 | Ikeda et al. | ................ | 277/503 |
| 5,353,890 A * | 10/1994 | Clohessy | ..................... | 180/247 |
| 5,518,302 A * | 5/1996 | Bernoni | ..................... | 301/105.1 |
| 6,099,003 A * | 8/2000 | Olszewski et al. | ....... | 280/93.512 |
| 6,398,240 B1 * | 6/2002 | Taylor | .................... | 280/93.512 |
| 2002/0089141 A1 * | 7/2002 | Bennett et al. | .......... | 280/93.512 |

* cited by examiner

*Primary Examiner* — Ruth Ilan
(74) *Attorney, Agent, or Firm* — Robert L. Wolter, Esq.; Beusse Wolter Sanks Mora & Maire, P.A.

(57) ABSTRACT

A steering knuckle for adapting a unit bearing front axle of a vehicle using original equipment manufacturer (OEM) spindle and wheel hub assembly parts to replace the unit-bearing wheel assembly, wherein the steering knuckle comprises a first side of the steering knuckle that is configured to receive one or more components of the OEM spindle and wheel hub assembly. The steering knuckle includes a boring for receiving a spindle hub on an OEM spindle, and one or more apertures circumferentially spaced around the boring and for alignment with holes on a spindle flange of the OEM spindle. Studs are inserted through the apertures of the steering knuckle for securing the OEM spindle to the steering knuckle. A second side of the steering knuckle is configured to be affixed in pivoting relationship to an axle housing of the vehicle wherein the axle housing is originally manufactured to be linked to a unit-bearing steering knuckle.

4 Claims, 4 Drawing Sheets

SYSTEM AND METHOD FOR ADAPTING A UNIT BEARING FRONT DRIVING AXLE

SPECIFIC DATA RELATED TO THE INVENTION

This application claims the benefit of U.S. Provisional Application No. 61/037,486 filed Mar. 18, 2008.

FIELD OF THE INVENTION

An embodiment of the invention pertains to axle and wheel assemblies for four-wheel drive vehicles. More particularly, embodiments of the invention pertain to systems, kits or methods for converting of a unit bearing style front axle for a four-wheel drive vehicle to a spindle and wheel hub assembly.

BACKGROUND OF THE INVENTION

Enthusiasts who take four-wheel drive vehicles off-road often modify their vehicles to enhance performance in such environments. Many modern four-wheel vehicles are equipped with non-serviceable unit-bearing hubs that combine a driving axle shaft, support bearings and a wheel hub. In such unit-bearing assembly designs, the axle shaft supports the front wheel. If the vehicle axle transmits power and supports the front wheel, the drive train is constantly rotating so drive line vibrations often occur. A common modification is a change in the suspension of the vehicle so that the body and chassis is raised up or "lifted" to provide more ground clearance. This results in even more driveline vibrations, particularly at highway speeds. Another common problem caused by "lifting" is that the steering geometries are changed and the vehicle can become unstable unless the steering knuckle provides a means to attach the steering components in a position that is similar to the factory attachment points.

In either a factory stock vehicle or a modified vehicle, there are numerous disadvantages to the unit bearing system. Since the axle shaft must both power and support the wheel, the shaft is highly loaded making it prone to failure. If the axle shaft fractures, there is nothing to hold the wheel in place and consequently, it can fall off the vehicle with predictably dangerous results. Another disadvantage with this system is that the drive train is constantly rotating which causes wear and tear on the drive train along with increased fuel consumption. If the vehicle suspension has been raised higher than delivered by the factory, the steering linkage and geometry is compromised, and the vehicle can become skittish when the vehicle hits bumps in the road.

A unit-bearing assembly is illustrated in FIG. 1, and includes a stub shaft 10 connected to an inside axle 11 by a universal joint 15. A steering knuckle 12 is mounted to an axle housing 13 at ball joints 14 and is linked to a vehicle steering assembly for steering. As shown, the unit bearing 16 is affixed to the steering knuckle 12, and a sleeve 17 on the wheel drive flange 18 is inserted in the unit bearing 16. An axle nut 19 is threaded on the stub shaft 10 at the wheel drive flange 18 securing the stub shaft 10 in position. The sleeve 17 on the wheel flange 18 has internal splines (not shown) that mate with external splines 20 on the stub shaft 10. Accordingly, as the inside axle 11 rotates the stub shaft 10 is rotated providing drive power to the wheel drive flange 18 on which a wheel (not shown) is mounted. Bearings 17 within the unit bearing 16 enable rotation of the wheel axle flange 18. Another disadvantage of these unit bearing systems is that if larger tires are mounted on wheel axle flange 18 the tires may be offset away from the vehicle to avoid the vehicle's chassis and inner fenders. This places an extreme amount of leverage on the axle or stub shaft 10, and the bearings 17 within the unit may not support the axle, which can break causing the wheel to fall off.

Some four-wheel drive models are equipped with spindle and wheel hub assemblies that include a spindle mounted to the steering knuckle wherein the stub shaft, having been connected to the inner front axle, passes through the spindle and into a wheel hub. A lock out hub is connected to the wheel hub and the end of the stub shaft at the wheel hub. A series of splines on the stub shaft end, the lock out hub and wheel hub enable the transfer of power from the stub shaft to the wheel hub. In this manner, the spindle supports the tire and wheel and allows an axle drive shaft to pass through the center of the spindle to provide power to drive the front wheels. Such a system provides a couple of advantages over the above-described unit bearing assemblies. One advantage is that if the front driving axle breaks the wheel remains supported by the wheel hub (and indirectly by the spindle) and does not fall off.

In addition, the lock out hub is operable to disconnect the stub shaft from the wheel hub allowing the wheel to rotate freely. This saves wear and tear on the drive train and improves gas mileage since the drive train is not spinning continuously. Also, using a spindle to support the wheel increases the strength of the front driving axle because the wheel support bearings are not loaded as highly.

Systems or kits are available to convert a unit-bearing front axle assembly to a spindle and wheel hub assembly. Dynatrac (www.dynatrac.com) located in Huntington Beach, Calif. provides such a kit, which is called a "stub-hub conversion" kit. This kit includes a stub shaft, spindle and wheel hub (among other components) that are custom designed to fit the existing unit-bearing steering knuckles or a Dynatrac steering knuckle, which is similar to the OEM unit bearing steering knuckles. However, existing OEM components and parts for spindle and wheel hub assemblies do not match either OEM or the Dynatrac unit bearing steering knuckles, because such components are designed for use with spindle design steering knuckles. Unfortunately, Dynatrac is the sole source of the spindle and wheel hub components that match and fit the unit-bearing steering knuckles. Accordingly, if parts to the Dynatrac kit are broken or otherwise rendered inoperable, the end user is limited to obtaining replacements from the single source and do not have the advantage of multiple sources. The Dynatrac spindle and wheel hub and related parts are not OEM parts. Accordingly, a need exists for a kit or steering knuckle to convert a unit bearing front axle that utilizes OEM spindle and wheel hub assembly components, and are not limited to custom spindle components.

SUMMARY OF THE INVENTION

A steering knuckle for adapting a unit bearing front axle of a vehicle using original equipment manufacturer (OEM) spindle and wheel hub assembly parts to replace the unit-bearing wheel assembly, wherein the steering knuckle comprises a first side of the steering knuckle that is configured to receive one or more components of the OEM spindle and wheel hub assembly. The steering knuckle includes a boring for receiving a spindle hub on an OEM spindle, and one or more apertures circumferentially spaced around the boring and for alignment with holes on a spindle flange of the OEM spindle. Studs are inserted through the apertures of the steering knuckle for securing the OEM spindle to the steering knuckle. A second side of the steering knuckle is configured to be affixed in pivoting relationship to an axle housing of the vehicle wherein the axle housing is originally manufactured to be linked to a unit-bearing steering knuckle.

A mounting area may be on top of the steering knuckle for connecting a steering assembly to the steering knuckle for example in the case when the suspension of a vehicle is raised. An extension arm is affixed to the mounting area to link the steering assembly to the steering knuckle. An OEM brake backing plate is provided and is disposed between the OEM spindle and an OEM wheel hub. The plate has a boring through which the spindle is disposed and a plurality of bolt holes circumferentially spaced around the boring for alignment with holes on the spindle flange and studs on the steering knuckle to affix the plate to the spindle and knuckle.

In addition, an embodiment of the invention allows the conversion from a unit-bearing drive axle system to a spindle and wheel-hub assembly in which the axle housing to which the second side of the knuckle is attached mounted on a vehicle that is a lighter duty vehicle as to a vehicle (which is a heavier duty vehicle) for which the spindle and wheel hub assembly is manufactured. Accordingly, larger tires and OEM brakes may be connected to the lighter duty front drive axle.

The term original equipment manufacturer or OEM or OEM type as used herein and above includes the parts and components from such manufacturers, matching parts or components made by others, replacement parts that match dimension for dimension or piece for piece the OEM parts, or any other such parts including buy not limited any aftermarket parts.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
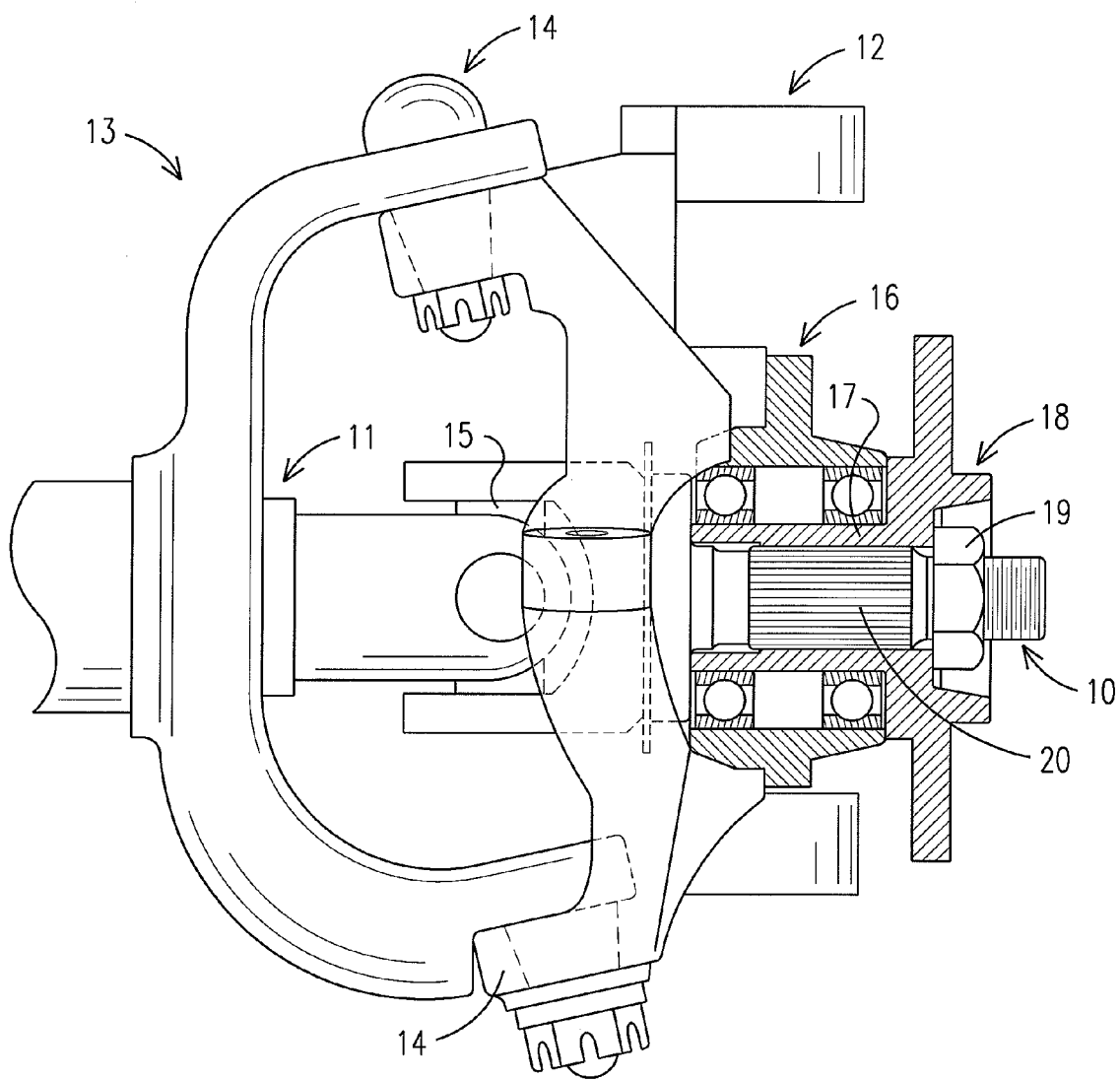
FIG. 1 is a sectional view of a prior art unit-bearing wheel assembly.

Reference will now be made in detail to the embodiments consistent with the invention, examples of which are illustrated in the accompanying drawings. Wherever possible, the same reference numerals are used throughout the drawings and refer to the same or like parts.

Figure 2:
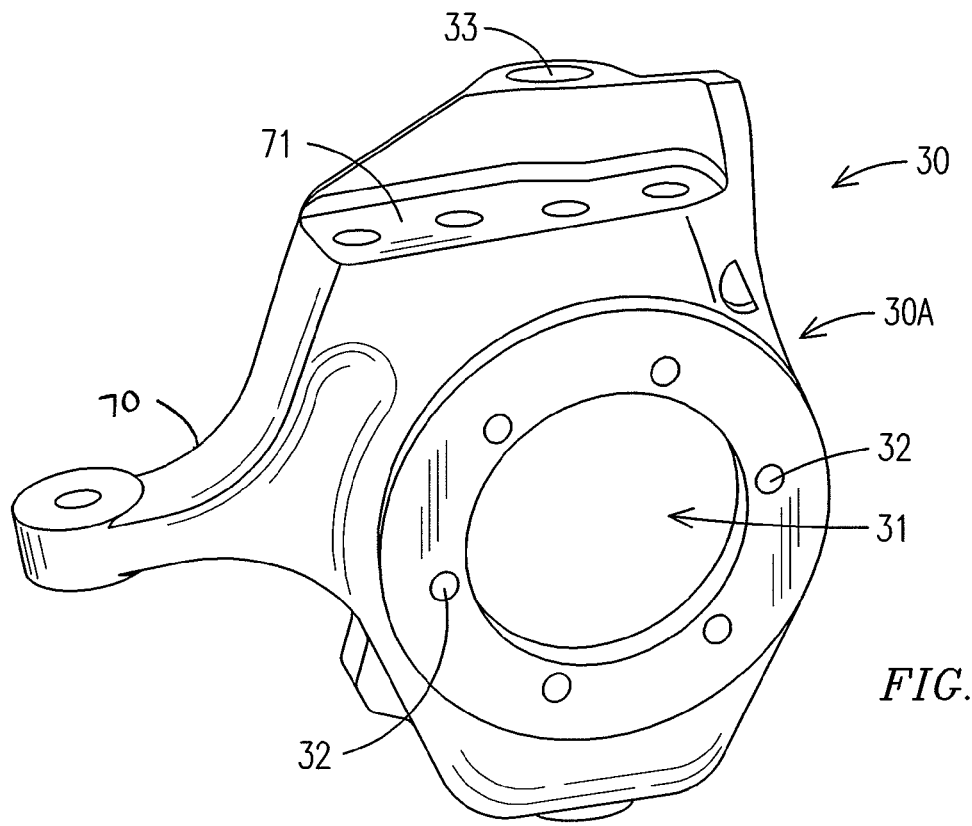
FIG. 2 is a perspective view of a side of an embodiment of the novel steering knuckle.
Figure 3:
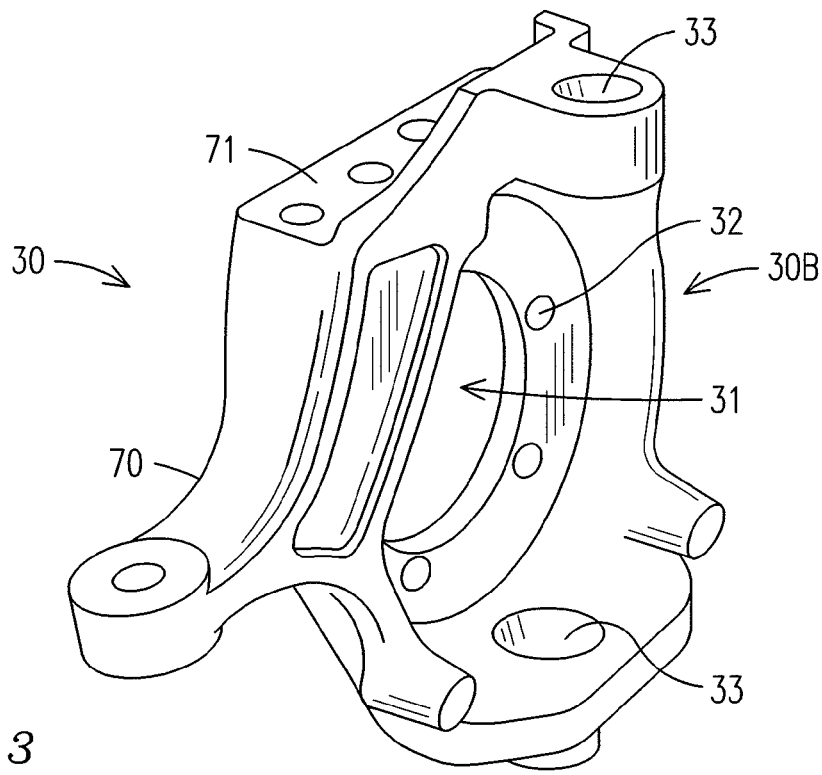
FIG. 3 is a perspective view of the other side of the novel steering knuckle shown in FIG. 1.

With respect to FIGS. 2 and 3, there is illustrated an embodiment of a novel steering knuckle 30 that includes a first side 30A that is configured to match or receive the OEM parts or components of a spindle and wheel hub assembly. In addition, the steering knuckle 30 comprises a second side 30B that is configured to match or receive an axle housing of a vehicle manufactured to include a unit-bearing front axle assembly. For example, the first side 30A of the steering knuckle 30 includes a boring 31 and apertures 32 spaced circumferentially around the boring 30 wherein the boring 31 and apertures 32 are configured for receiving and affixing an OEM spindle to the steering knuckle 30. In addition, the second side 30B of the steering knuckle 30 includes tapered holes 33 positioned on the knuckle 30 for receiving studs of ball joints on the axle housing that has been originally manufactured to link with a unit-bearing steering knuckle.

Note the steering knuckle 30 also includes a steering arm 70 to which a vehicle steering assembly is linked. In addition, a mounting area 71 is provided at the top end of the knuckle 30 for attaching an extension 72 in order to link the steering assembly to the knuckle 30. This feature is provided in order to raise the link between the steering knuckle 30 and the steering assembly to account for the suspension of the vehicle being raised relative to its original manufacturing.

Figure 4:
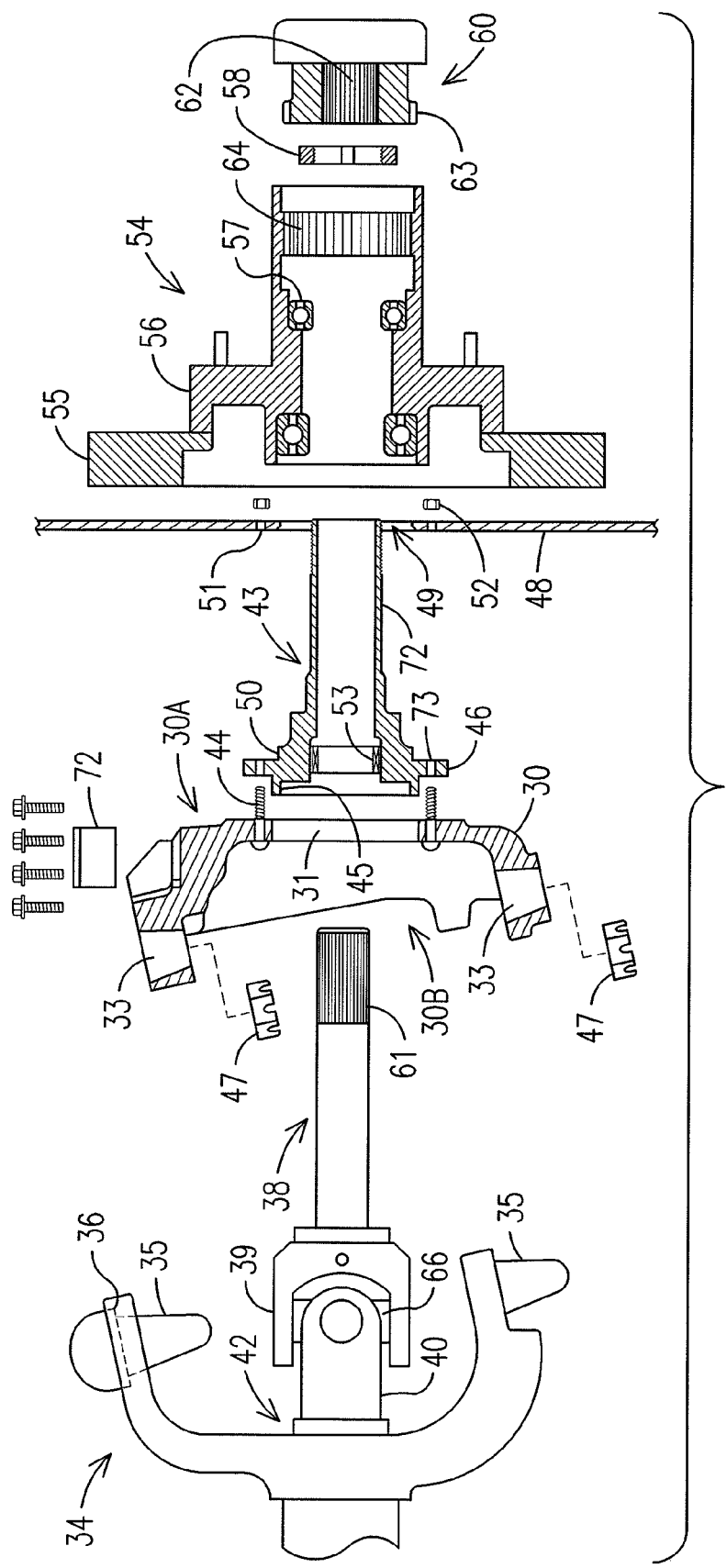
FIG. 4 is an exploded sectional view of front wheel drive assembly with a steering knuckle used with a spindle/wheel hub assembly replacing the unit bearing assembly.
Figure 5:
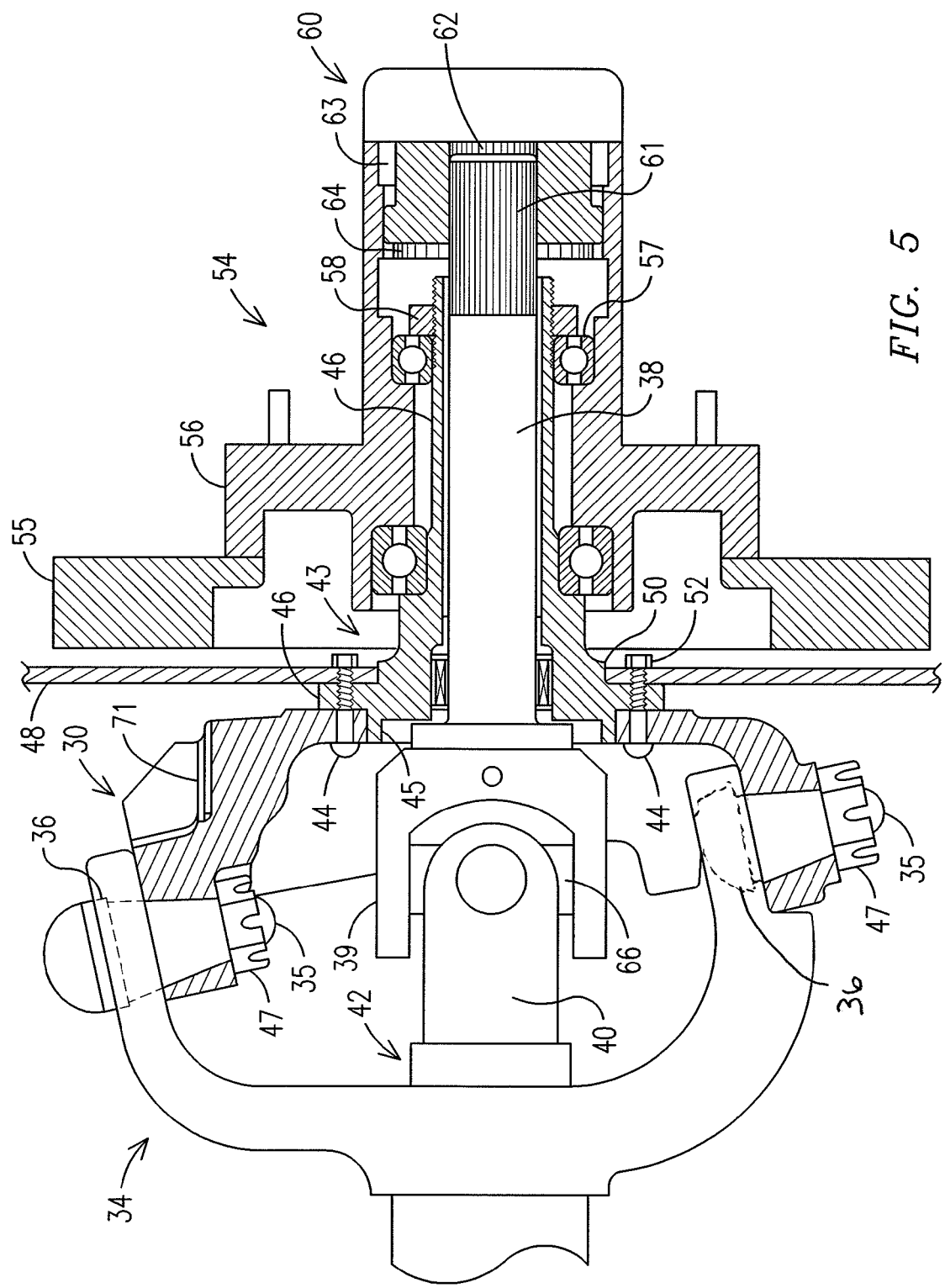
FIG. 5 is a sectional view of the system in FIG. 4 having been assembled.

In reference to FIGS. 4 and 5, there is illustrated the steering knuckle 30 and a spindle and wheel hub assembly shown replacing the unit bearing system and knuckle in FIG. 1. In order to convert the front drive axle, the unit bearing assembly, stub shaft 10 and steering knuckle 12 are removed. The assembly of the spindle/wheel hub and steering knuckle 30 is initiated by first securing the steering knuckle 30 to the axle housing 34 by securing studs 35 of the ball joints 36 on the axle housing 34. More specifically, the studs 35 are positioned in the tapered holes 33 on the second side 30B of the steering knuckle 30, and nuts 47 fitted over the studs 35 secure the knuckle 30 to the axle housing 34, and enable the steering knuckle 30 to pivot relative to the axle housing 34.

A stub shaft 38 is then connected to the inner axle 42. More specifically, a yoke 39 on stub shaft 38 is connected to a yoke 40 on the inner axle 42 using a universal joint 66 as known to those skilled in the art. This assembly is then inserted through the boring 31 and disposed within the axle housing 34 until inner axle 42 has bottomed into the axle housing 34.

A spindle 43 is then mounted to the first side 30A of the steering knuckle 30. Prior to attaching the knuckle 30 to the axel housing 34, studs or bolts 44 are force fitted through the apertures 32 on the knuckle 30. The spindle 43 includes a hollow shaft 72 for receiving the stub shaft 38 as shown in FIGS. 4 and 5. The spindle 43 includes a spindle hub 45 that is aligned and fitted in the boring 31, so that a spindle flange 46 abuts the surface of the steering knuckle 30 and holes 73 in the flange 46 are aligned with studs 44 on the knuckle 30. The boring 31 is machined in the knuckle 30 so that the interface between the spindle hub 45 and boring 31 to provide minimal clearance. In addition, a brake backing plate 48, which also includes a boring 49 is positioned on the spindle 43 and supported by a shoulder 50. The holes 51 on the brake backing plate 48 are aligned with the studs 44, and nuts 52 secure the spindle 43 between the steering knuckle 30 and the brake backing plate 48. Note, that the spindle 43 includes a bearing 53 that supports the stub shaft 38 within the spindle 43.

A wheel hub assembly 54, which includes a brake rotor 55 affixed to a wheel hub 56 is positioned over the spindle 43 and stub shaft 38 as shown in FIGS. 4 and 5. Bearings 57 within the wheel hub 56 support the wheel hub 56 on the spindle 43 so the wheel hub 56 rotates on the spindle 43 during operation of the vehicle. A spindle nut 58 is threaded onto an end of the spindle 43 and against bearings 57 that are disposed within the wheel hub 56 to secure the wheel hub 56 on the spindle 43. A lock-out hub 60 is affixed to the end of the wheel hub 56. As illustrated, the end of the stub shaft 38 includes external splines 61 that are placed in mating relationship with internal splines 62 on the lock-out hub 60. In addition, external splines 63 on the lock-out hub are positioned in mating relationship with internal splines 64 on the wheel hub 56. In this manner, the rotational force of the stub shaft 38 may be transferred to the wheel hub 56 to rotate a wheel on the vehicle.

As noted above, the steering knuckle 30 is configured on one side to mount to the axle house 34 that has been originally manufactured to operate with a unit bearing steering knuckle. The other side of the knuckle 30 is configured to receive an OEM spindle 43 of a spindle and wheel hub assembly. In this manner, an end user may use a variety of sources or vendors from which to select the parts for the spindle and wheel hub assembly. In contrast, the prior art conversions are provided with custom designed spindle and wheel hub assemblies that are designed to fit a unit-bearing wheel assembly. Such an assembly limits the sources of parts that can fit the unit-bearing steering knuckle. If a part breaks the OEM parts for a spindle and wheel hub assembly won't fit the unit bearing steering knuckle, or the components of the custom assembly.

An embodiment of the invention or steering knuckle 30 may be used to convert a lighter duty axle equipped to receive a unit-bearing system assembly to receive a spindle and wheel hub assembly typically used with heavier duty axles. For example, Dana Corporation is an axle supplier to OEM car companies. Dana manufactures a series of front driving axles that are used in all wheel drive vehicles ranging from small sport vehicles up to large industrial trucks and off road construction equipment. The axle families are typically designated by a number series wherein the larger number indicating a heavier axle. The most common axle in production now is the Dana 30 which is used primarily in JEEP vehicles. These are light weight sport vehicles and the axle is light duty. The next family up is the Dana 44 which is a much heavier duty axle that was and is used in full size trucks and incorporates a spindle system.

The disclosed knuckle 30 is able to convert the Dana 30 unit-bearing assembly to a Dana 44 spindle. By doing so, larger tires may be used on the Dana 30 axle assembly with the Dana 44 spindle and wheel hub assembly. Accordingly, larger tires may be used with the lighter duty axle assembly. When one mounts larger tires on a vehicle, more leverage is exerted on the brakes making it harder to stop the vehicle, so the brakes should be upgraded also. With the disclosed steering knuckle 30 that receives the spindle and wheel hub assembly of a heavier duty vehicle, a larger brake rotor 57 is provided. Accordingly, larger brakes may be provided. Indeed, OEM brakes that match the spindle and wheel may be mounted thereon. These larger brakes increase the stopping effectiveness of a brake system as necessary for the larger tires.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

What is claimed is:

1. A steering knuckle for converting an original equipment manufacturer (OEM) unit bearing front axle assembly including a unit bearing axle housing of a vehicle to support OEM spindle and wheel hub assembly parts, the steering knuckle, comprising:
   a first side that is configured to and dimensioned to support one or more components of an OEM spindle and wheel hub assembly and the steering knuckle includes a boring that receives a spindle hub on an OEM spindle, and one or more apertures circumferentially spaced around the boring and for alignment with holes on a spindle flange of the OEM spindle, and with studs or bolts insertable through the apertures of the steering knuckle for securing the OEM spindle to the steering knuckle;
   the steering knuckle having a second side that is configured and dimensioned to be affixed in pivoting relationship to the OEM unit bearing axle housing; and,
   wherein the steering knuckle allows the OEM unit bearing axle housing to be capable of supporting the OEM spindle and wheel hub assembly.

2. The system of claim 1 wherein the steering knuckle comprises a mounting area on top of the steering knuckle on which an extension arm is mounted for connecting a steering assembly to the steering knuckle.

3. The system of claim 1 further comprising a brake backing plate that is disposed between the OEM spindle and an OEM wheel hub, the plate having a boring through which the spindle is disposed and a plurality of bolt holes circumferentially spaced around the boring for alignment with holes on the spindle flange.

4. The steering knuckle of claim 1 wherein the first side of the steering knuckle is configured and dimensioned to receive one or more components of a spindle and wheel hub assembly that are OEM components for a vehicle that has a heavier duty axle assembly relative to the vehicle on which the OEM unit bearing axle housing is mounted.

* * * * *